United States Patent Office.

ROBERT LOVE, OF HOBOKEN, NEW JERSEY.

Letters Patent No. 81,916, dated September 8, 1868.

IMPROVED VARNISH FOR METAL, WOOD, AND PAPER, OR OTHER FABRIC.

*The Schedule referred to in these Letters Patent and making part of the same.*

Be it known that I, ROBERT LOVE, M. D., of Hoboken, in the State of New Jersey, have invented new and useful Improvements in Enamel Paint or Varnish; and I hereby declare that the following is a full and exact description thereof.

The nature of my invention consists in providing a cheap, durable paint, or enamel, or varnish, by whichever name it may be called, that is perfectly impervious to water, oil, or other substance, and which makes a handsome and durable coating for wood, iron, or other metallic substance, leather, cloth, paper, or glass, and can be applied in any ordinary manner.

When applied to any metallic surface, it preserves it from rusting or corroding in either salt or fresh water, and is therefore of great value as a coating for ships' bottoms, either upon the copper or upon the wood, as well as upon many other articles upon which an ornamental enamel is desired.

It can also be applied upon wood, brick, or stone, for outside work, with great advantage, and being entirely impervious to water or dampness will preserve wood for years. It can be made any shade or color by the use of any ordinary coloring-matter, and can be used with very great advantage in ornamental work. It also, when applied to cloth or leather, or paper, forms a very beautiful enamel, and becomes perfectly hard and impervious.

To enable others skilled in the art to form my composition, I will describe its ingredients and component parts, as follows:

To eighty-five (85) parts of white refined gum-shellac, add seven parts of gum-sandarac, five parts of gum-elemi, and three parts of roasted gum-amber, mixed with alcohol in proportion of one gallon to four pounds of the combined parts, when mixed; alcohol to be boiling when mixed.

When applied to steel, glass, or any very smooth surface, the use of a little greater proportion of alcohol gives a more perfect surface.

The composition can be applied with an ordinary painter's brush, or in any other convenient manner.

Having described my improvement, what I claim as my invention, and desire to secure by Letters Patent, is—

An enamel, paint, or varnish, composed substantially as described, for the purposes specified.

I also claim forming or compounding an enamel, paint, or varnish of the materials specified, substantially as described.

ROBERT LOVE.

Witnesses:
GEO. H. COLLINS,
THOMAS J. BALDWIN.